Craven & Davis.

Hay Loader.

No 2192

Reissued Mar. 13, 1866.

Witnesses.

John G. Witt.

Fred C. Swiger.

Inventor.

Thos. B. Craven.

UNITED STATES PATENT OFFICE.

THOMAS C. CRAVEN, OF ALBANY, ASSIGNOR TO HIMSELF AND WILLIAM H. DAVIS, OF NEW YORK, N. Y.

IMPROVEMENT IN COMBINED HAY SPREADER AND ELEVATOR.

Specification forming part of Letters Patent No. 51,650, dated December 19, 1865; Reissue No. 2,192, dated March 13, 1866.

*To all whom it may concern:*

Be it known that I, THOMAS C. CRAVEN, of Albany, in the State of New York, have invented certain new and useful Improvements in the machine for elevating hay or grass from the ground and discharging into wagons or carts, and which may be employed for tedding or spreading it after it has been mowed; and I do hereby declare that the following is a full, clear, and exact description thereof, reference being had to the accompanying drawings, making part of this specification, in which—

Figure 3:
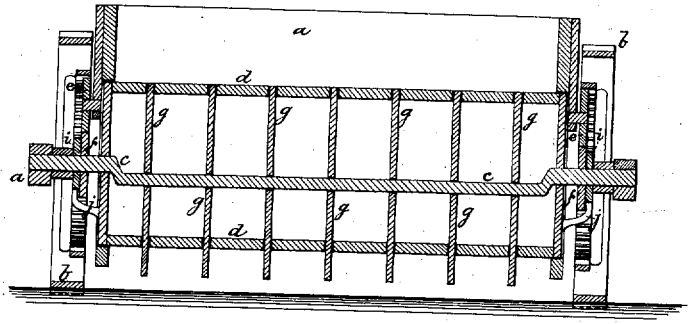
Figure 1:
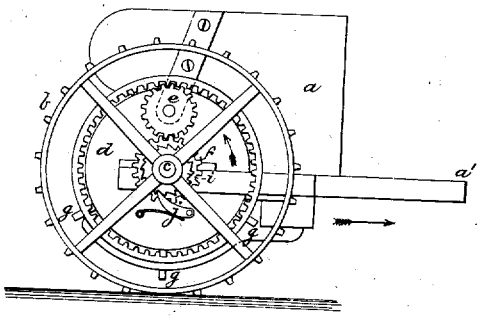
Figure 2:
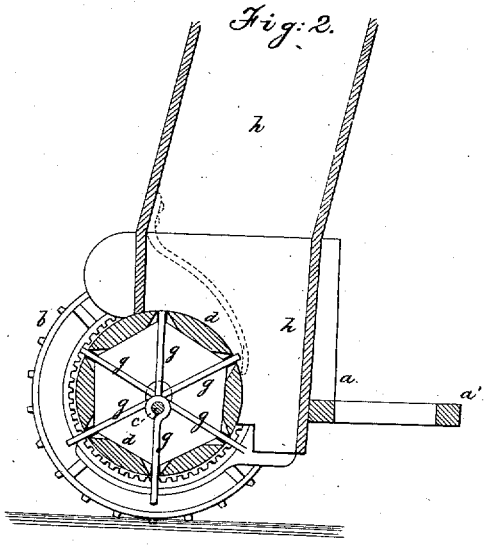

Figure 1 is a side elevation; Fig. 2, a longitudinal vertical section, and Fig. 3 a cross vertical section.

The same letters indicate like parts in all the figures.

The object of my said invention is to rake up grass or hay after it has been mowed, and force it up into and through a chute or trunk, from which it is delivered into a wagon or cart; and my said invention may also be employed for tedding or spreading grass or hay on the surface of the ground after it has been mowed.

In the accompanying drawings, *a* represents a suitable frame, which may be connected with the rear end of the wagon or other vehicle onto which the cut grass or hay is to be discharged and loaded; and the forward end of the said frame, at *a'*, may be fitted to receive a pole or shafts for a horse or horses when the machine is to be used for tedding or spreading grass. This frame is mounted on a pair of wheels, *b b*, that turn freely on the end of the axle-tree *c*, the periphery of the said wheels being formed with spurs to take into the ground, as is usual in mowing and other machines in which the wheels are employed to drive the machinery. One of the said wheels (or, if desired, both of them) is provided with an inner cogged rim, which drives a pinion, *e*, that turns on a stud connected with the frame, and the said pinion in turn engages with and drives a pinion, *f*, fitted to turn on the axle-tree close to the end of a hollow cylinder, *d*, so as to cause the said cylinder to turn on the axle-tree *c* in a direction the reverse of the wheels *b b*, as indicated by the arrow. The pinion *f* is fitted to turn freely on the axle-tree, and by the side of and connected with it is a ratchet-wheel, *i*, the teeth of which, when the machine is drawn forward, as indicated by an arrow, engage a spring-pawl, *j*, on the head or end of the cylinder, and thereby rotate the cylinder; but when the frame is moved backward the ratchet-hand or pawl permits the wheel to turn without communicating motion to the cylinder.

The cylinder *d*, as before stated, is hollow, and its heads are fitted to turn freely on the shaft or axle-tree *c*, which is bent to form a crank within and extending the whole or nearly the whole length of the inside of the cylinder. Six rows of holes are made through the shell of the cylinder, and beveled on the inside, as represented, to receive six sets of teeth, *g*, which are mounted on the eccentric or crank part of the axle-tree *c*, and these teeth are of such length that in the rotation of the cylinder as they pass below the axle-tree they project beyond the periphery of the cylinder about double the radius of the crank, and in passing around they are gradually drawn in so as to be flush or a little within the periphery of the cylinder when vertically over the axle-tree. In this way, by the eccentric movement, the teeth are gradually protruded from and then gradually drawn into the cylinder.

A chute or trunk, *h*, is mounted on the frame *a*, with the front part a short distance forward of the cylinder and extending nearly as low as the cylinder, and the back part coming down and just clearing the upper part of the cylinder. The upper part of this chute inclines forward, so that its upper end may deliver the grass or hay into the vehicle to which the machine may be attached.

As the machine is drawn forward the teeth, by the rotation of the cylinder, catch the hay or grass lying on the ground and throw it up into the chute, and as it accumulates it is gradually forced up from the lower part to the top, where it is discharged into the wagon in front, and in the revolution of the cylinder the teeth are gradually drawn in to leave the grass or hay and to clear the rear part of the chute; otherwise much of the grass would be thrown over the cylinder and fall on the ground behind. When the chute is removed the cylinder, with its teeth, acts as a rotating raker to rake the grass on the ground and throw it over and scatter it on the surface of the ground, the front board of the machine acting as a shield to prevent the grass from being thrown forward.

In combination with the chute or elevating trunk a cylinder with permanent teeth projecting from its periphery may be substituted; but in that case the lower edge of the back part of the trunk must be cut off sufficiently high to clear the points of the teeth, and be provided with rods extending forward over a part of the cylinder and nearly to its periphery and between the rake-teeth, as represented by dotted lines, to act as deflectors and clearers to strip the grass from the rake-teeth and prevent it from being thrown back onto the ground.

What I claim as my invention, and desire to secure by Letters Patent, is—

1. The elevating-chute, in combination with the raking-cylinder deriving motion from the supporting and driving wheels, substantially as and for the purpose specified.

2. The rotating cylinder deriving motion from the driving and supporting wheels, in combination with the movable teeth projected and withdrawn by an eccentric or equivalent means, substantially as described, and for the purpose set forth.

THOS. C. CRAVEN.

Witnesses:
JOHN C. NOTT,
FRED. C. SWITZER.